(12) United States Patent
Kido

(10) Patent No.: US 9,792,519 B2
(45) Date of Patent: Oct. 17, 2017

(54) ENVIRONMENT RECOGNITION DEVICE AND ENVIRONMENT RECOGNITION METHOD

(75) Inventor: Shinnosuke Kido, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 1024 days.

(21) Appl. No.: 13/459,619

(22) Filed: Apr. 30, 2012

(65) Prior Publication Data

US 2012/0288150 A1 Nov. 15, 2012

(30) Foreign Application Priority Data

May 12, 2011 (JP) .................. 2011-107693

(51) Int. Cl.
G06K 9/00 (2006.01)
G06K 9/32 (2006.01)
G06K 9/20 (2006.01)

(52) U.S. Cl.
CPC ....... *G06K 9/3233* (2013.01); *G06K 9/00805* (2013.01); *G06K 9/00825* (2013.01); *G06K 9/2018* (2013.01)

(58) Field of Classification Search
CPC .......... G06K 9/00791; G06K 9/00798; G06K 9/00805; G06K 9/00812; G06K 9/00818; G06K 9/00825; G06K 2209/21; G06K 2209/23; G06K 9/3233; G06K 9/3241; G06K 9/2018; G06T 7/0081; G06T 7/408;

(Continued)

(56) References Cited

U.S. PATENT DOCUMENTS 8,670,612 B2 * 3/2014 Kido .................. 382/165
2002/0080998 A1 * 6/2002 Matsukawa ........ G06K 9/00818
382/103

(Continued)

FOREIGN PATENT DOCUMENTS

JP 2002-259969 A 9/2002
JP 3349060 B2 11/2002

(Continued)

OTHER PUBLICATIONS

Maldonado-Bascon et al., "Road-Sign Detection and Recognition Based on Support Vector Machines" Jun. 4, 2007, IEEE Transactions on Intelligent Transportation Systems, vol. 8, iss. 2, p. 264-278.*

*Primary Examiner* — Stephen R Koziol
*Assistant Examiner* — Timothy Choi
(74) *Attorney, Agent, or Firm* — McDermott Will & Emery LLP

(57) ABSTRACT

There are provided an environment recognition device and an environment recognition method. The environment recognition device obtains luminances of a target portion in a detection area of a luminance image, assigns a color identifier to the target portion according to the luminances of the target portion, based on association between a color identifier and a luminance range retained in a data retaining unit, and groups target portions assigned one of one or more color identifiers associated with a same specific object, and of which position differences in the width direction and in the height direction are within a predetermined range, based on association between the color identifier and the luminance range retained in the data retaining unit.

5 Claims, 11 Drawing Sheets

(58) Field of Classification Search
CPC . G06T 7/11; G06T 7/136; G06T 7/187; G06T 7/194
See application file for complete search history.

(56) References Cited

U.S. PATENT DOCUMENTS

2006/0233424 A1* 10/2006 Miyajima et al. ............ 382/104
2007/0047809 A1*  3/2007 Sasaki .......................... 382/170
2008/0123945 A1*  5/2008 Andrew ............. G06K 9/00456
                                                           382/164
2009/0316988 A1* 12/2009 Xu et al. ....................... 382/173
2010/0183225 A1*  7/2010 Vantaram et al. ............ 382/173

FOREIGN PATENT DOCUMENTS

| JP | 2007-072987 A | 3/2007 |
| JP | 2007-088687 A | 4/2007 |
| JP | 2010-224925 A | 10/2010 |

* cited by examiner

FIG. 4

| COLOR IDENTIFIER | | 1 | 2 | 3 | 4 | 5 | 6 | 7 | 8 |
|---|---|---|---|---|---|---|---|---|---|
| OVERVIEW | | RED | YELLOW | BLUE GREEN | MAGENTA | ORANGE | VERMILION | BLUE | GREEN |
| LUMINANCE RANGE | RED | ≥150 | ≥150 | ≤50 | ≥200 | ≥100 | ≥100 | ≤50 | ≤100 |
| | GREEN | ≤100 | ≥100 | ≥150 | ≤50 | ≥60 | ≤60 | ≤50 | ≥150 |
| | BLUE | ≤50 | ≤50 | ≥100 | ≤50 | ≤50 | ≤50 | ≥200 | ≤100 |

FIG. 5

| SPECIFIC OBJECT | | TRAFFIC LIGHT (RED) | TRAFFIC LIGHT (YELLOW) | TRAFFIC LIGHT (BLUE GREEN) | TAIL LAMP (MAGENTA) | TURN SIGNAL (ORANGE) | ROAD SIGN (VERMILION) | ROAD SIGN (BLUE) | ROAD SIGN (GREEN) |
|---|---|---|---|---|---|---|---|---|---|
| REPRESENTING COLOR IDENTIFIER | | 1 | 2 | 3 | 4 | 5 | 6 | 7 | 8 |
| COLOR IDENTIFIER | | 1 | 2 | 3 | 4 | 5 | 6 | 7 | 8 |
| | | 5 | 5 | 8 | 1 | 6 | 5 | 3 | 3 |
| | | 6 | – | – | 5 | 2 | – | – | – |
| WIDTH RANGE (m) | | 0.2 TO 0.4 | 0.2 TO 0.4 | 0.2 TO 0.4 | 0.1 TO 0.2 | 0.1 TO 0.2 | 0.3 TO 1.0 | 0.3 TO 1.0 | 0.3 TO 1.0 |

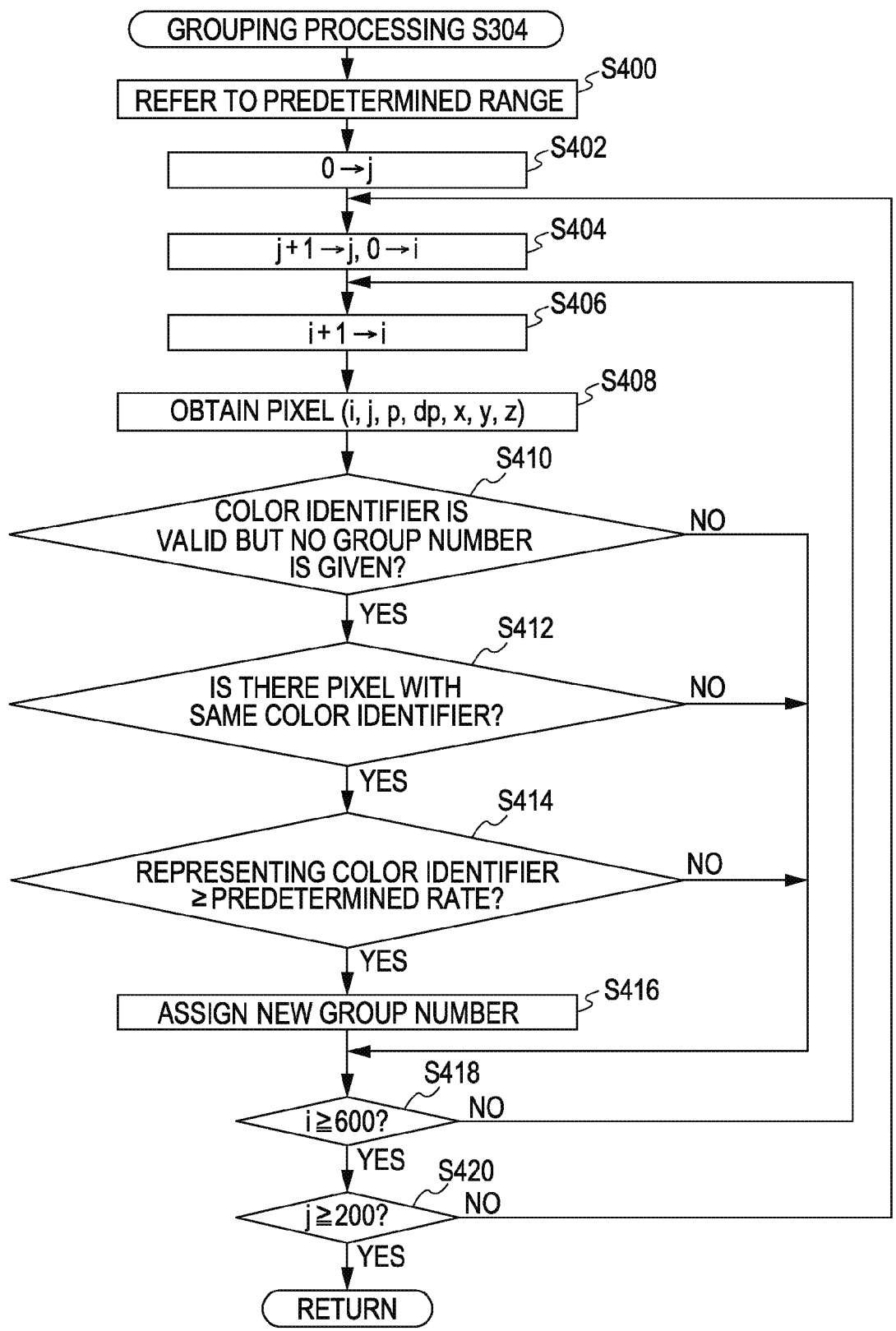

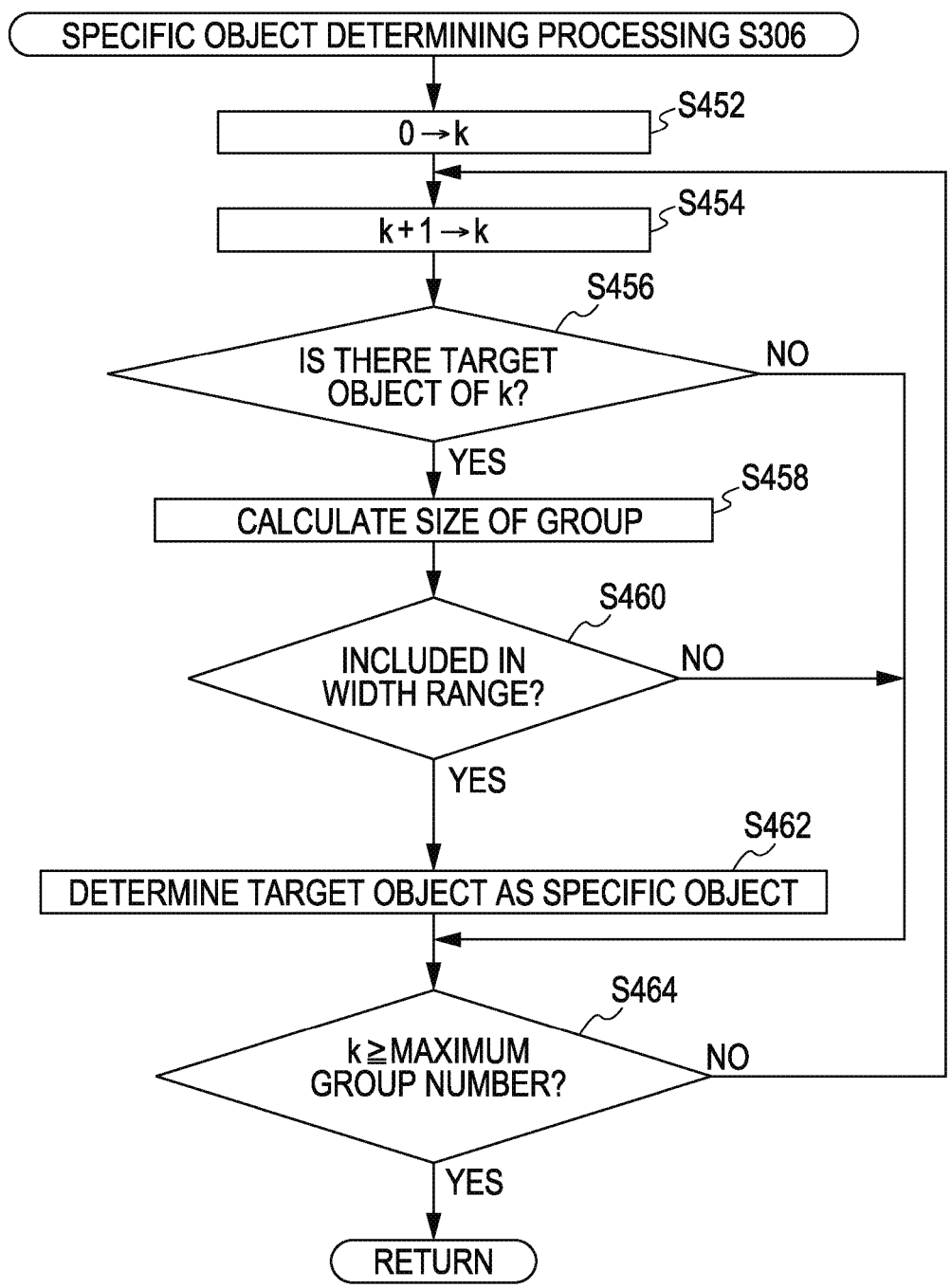

ENVIRONMENT RECOGNITION DEVICE AND ENVIRONMENT RECOGNITION METHOD

CROSS-REFERENCE TO RELATED APPLICATIONS

The present application claims priority from Japanese Patent Application No. 2011-107693 filed on May 12, 2011, the entire contents of which are hereby incorporated by reference.

BACKGROUND OF THE INVENTION

1. Field of the Invention

The present invention relates to an environment recognition device and an environment recognition method for recognizing a target object based or a luminance of the target object in a detection area.

2. Description of Related Art

Conventionally, a technique has been known that detects a target object such as an obstacle including a vehicle and a traffic light located in front of a subject vehicle for performing control to avoid collision with the detected target object and to maintain a safe distance between the subject vehicle and the preceding vehicle (for example, Japanese Patent. No 3349060 (Japanese Patent Application Laid-Open (JP-A) No. 10-283461). Further, in such techniques, there is a technique that performs more advanced control. Specifically, it not only specifies a target object simply as a solid object, but further determines whether the detected target object is a preceding vehicle that is running at the same speed as the subject vehicle or a fixed object that does not move. In this case, when the target object is detected by capturing an image of a detection area, it is necessary to extract (cut out) the target object from the captured image before specifying what the target object is.

For example, when the captured image is a color image, there may be a method for grouping pixels having a same luminance (color) and extracting the pixels as a target object.

However, regarding an actual traffic light, an actual road sign, and the like provided on a road, for example, color unevenness can be seen in an image corresponding to a lighting portion of a bulb traffic light, and thus a same target object may not necessarily emit light in a single color. Moreover, a false color may occur based on a Bayer pattern formed in checkered pattern, and therefore, it may be difficult to strictly specify one target object with only one luminance.

SUMMARY OF THE INVENTION

In view of such problems, it is an object of the present invention to provide an environment recognition device and an environment recognition method that improve the efficiency and accuracy of specifying a target object.

In order to solve the above problems, an aspect of the present invention provides an environment recognition device that includes: a data retaining unit that retains association between a predetermined number of color identifiers and a luminance range, and retains association between one or more color identifiers and a specific object; a luminance obtaining unit that obtains a luminance of a target portion in a detection area of a luminance image; a color identifier assigning unit that assigns a color identifier to the target portion according to the luminance of the target portion, based on the association between the color identifier and the luminance range retained in the data retaining unit; and a grouping unit that groups target portions that are assigned one of one or more color identifiers associated with a same specific object, and of which position differences in the horizontal direction and in the vertical direction are within a predetermined range, based on the association between a specific object and a color identifier retained in the data retaining unit.

Each specific object may be previously assigned a representing color identifier which is one of one or more color identifiers associated with a specific object, and when the grouped target portions include the representing color identifier, the grouping unit may group the target portions.

The grouping unit may replace all the color identifiers of the grouped target portions with the representing color identifier.

In order to solve the above problems, another aspect of the present invention provides an environment recognition method that includes: obtaining a luminance of a target portion in a detection area of a luminance image; assigning a color identifier to the target portion according to the luminance of the target portion, based on the association between a color identifier and a luminance range retained in a data retaining unit; and grouping target portions which are assigned one of one or more color identifiers associated with a same specific object, and of which position differences in the horizontal direction and in the vertical direction are within a predetermined range based on the association between a specific object and a color identifier retained in the data retaining unit.

According to the present invention, the accuracy of specifying the target object can be improved, and therefore, false recognition can be avoided.

BRIEF DESCRIPTION OF THE SEVERAL VIEWS OF THE DRAWINGS

FIG. 4 is an explanatory diagram for explaining a color table;

FIG. 5 is an explanatory diagram for explaining a specific object table;

FIG. 11 is a flowchart illustrating a flow of grouping processing; and

FIG. 12 is a flowchart illustrating a flow of specific object determining processing.

DETAILED DESCRIPTION OF THE INVENTION

Figure 1:
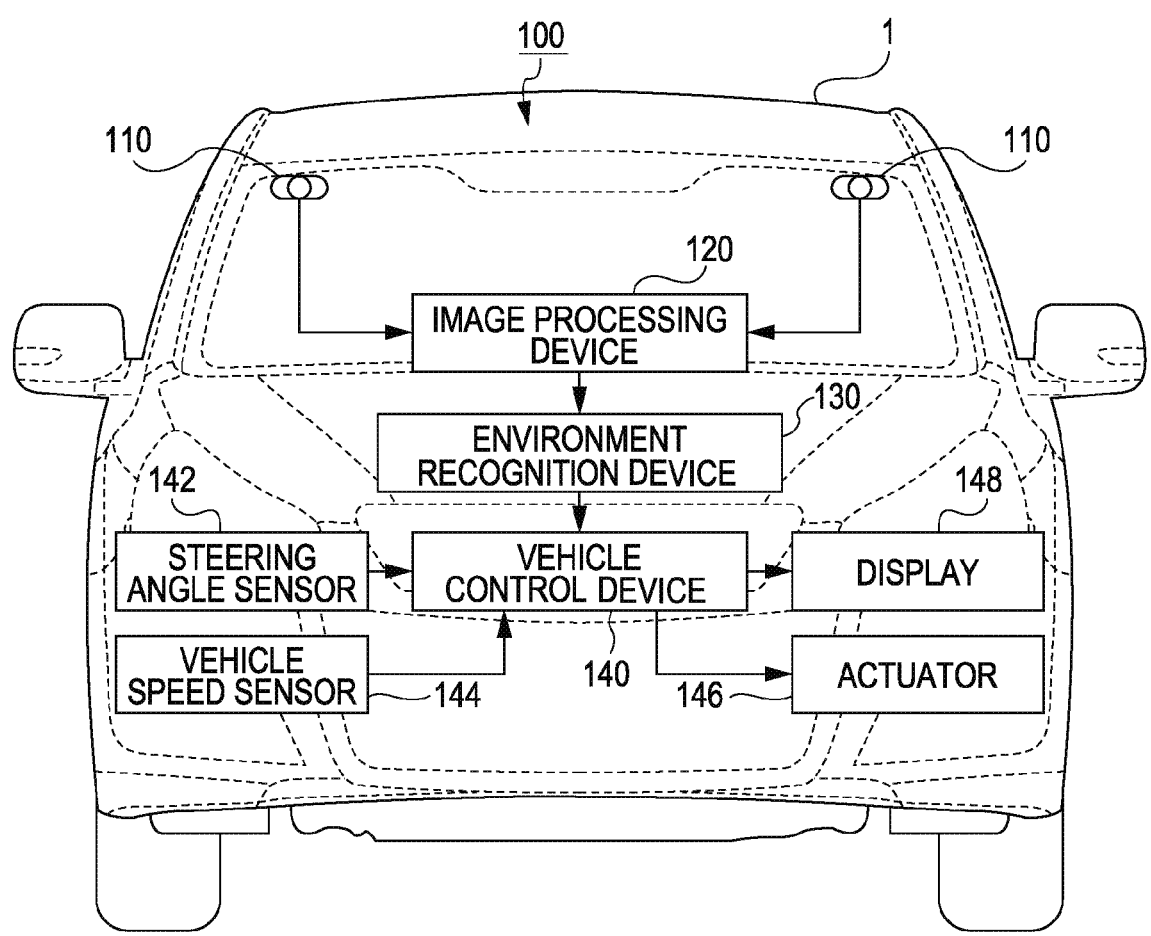
FIG. 1 is a block diagram illustrating a connection relationship in an environment recognition system.

A preferred embodiment of the present invention will be hereinafter explained in detail with reference to attached drawings. The size, materials, and other specific numerical values shown in the embodiment are merely exemplification for the sake of easy understanding of the invention, and unless otherwise specified, they do not limit the present invention. In the specification and the drawings, elements having substantially same functions and configurations are denoted with same reference numerals, and repeated explanation thereabout is omitted. Elements not directly related to the present invention are omitted in the drawings.

(Environment Recognition System 100)

FIG. 1 is a block diagram illustrating connection relationship in an environment recognition system 100. The environment recognition system 100 includes a plurality of image capturing devices 110 (two image capturing devices 110 in the present embodiment), an image processing device 120, an environment recognition device 130, and a vehicle control device 140 that are provided in a vehicle 1.

The image capturing devices 110 include an imaging element such as a CCD (Charge-Coupled Device) and a CMOS (Complementary Metal-Oxide Semiconductor), and can obtain a color image, that is, a luminance consists of three color phases (red, green, blue) per pixel. In the present embodiment, color and luminance are dealt in the same way; if both wordings are included in one sentence, both can be read as luminance configuring color, or color having a luminance. In this case, a color image captured by the image capturing devices 110 is referred to as luminance image and is distinguished from a distance image to be explained later. The image capturing devices 110 are disposed to be spaced apart from each other in a substantially horizontal direction so that optical axes of the two image capturing devices 110 are substantially parallel in a proceeding direction of the vehicle 1. The image capturing device 110 continuously generates image data obtained by capturing an image of a target object in a detection area in front of the vehicle 1 at every 1/60 seconds (60 fps), for example. In this case, the target object may be not only an independent three-dimensional object such as a vehicle, a traffic light, a road, and a guardrail, but also an illuminating portion such as a tail lamp, a turn signal, a traffic light that can be specified as a portion of a three-dimensional object. Each later-described functional unit in the embodiment performs processing in response to the update of such image data.

The image processing device 120 obtains image data from each of the two image capturing devices 110, and derives, based on the two pieces of image data, parallax ax information including a parallax of any block (a set of a predetermined number of pixels) in the image and a position representing a position of the any block in the image. Specifically, the image processing device 120 derives a parallax using so-called pattern matching that searches a block in one of the image data corresponding to the block optionally extracted from the other image data. The block is, for example, an array including four pixels in the horizontal direction and four pixel s in the vertical direction. In this embodiment, the horizontal direction means a horizontal direction for the captured image, and corresponds to the width direction in the real world. On the other hand, the vertical direction means a vertical direction for the captured image, and corresponds to the height direction in the real world.

One way of performing the pattern matching is to compare luminance values (Y color difference signals) between two image data by the block indicating any image position. Examples include an SAD (Sum of Absolute Difference) obtaining a difference of luminance values, an SSD (Sum of Squared intensity Difference) squaring a difference, and an NCC (Normalized Cross Correlation) adopting the degree of similarity of dispersion values obtained by subtracting a mean luminance value from a luminance value of each pixel. The image processing device 120 performs such parallax deriving processing on all the blocks appearing in the detection area (for example, 600 pixels×200 pixels). In this case, the block is assumed to include 4 pixels×4 pixels, but the number of pixels in the block may be set at any value.

Although the image processing device 120 can derive a parallax for each block serving as a detection resolution unit, it is impossible to recognize what kind of target object the block belongs to. Therefore, the parallax information is not derived by the target object, but is independently derived by the resolution (for example, by the block) in the detection area. In this embodiment, an image obtained by associating the parallax information thus derived (corresponding to a later-described relative distance) with image data is referred to as a distance image.

Figure 2A:
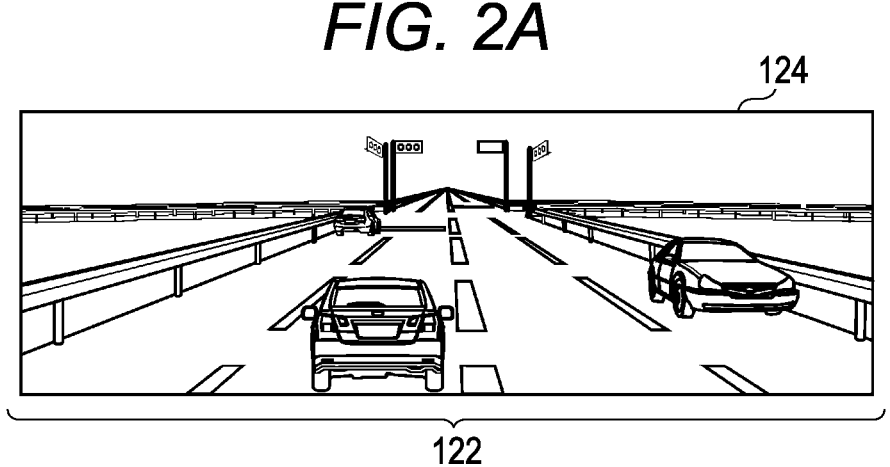
FIGS. 2A and 2B are explanatory diagrams for explaining a luminance image and a distance image.
Figure 2B:
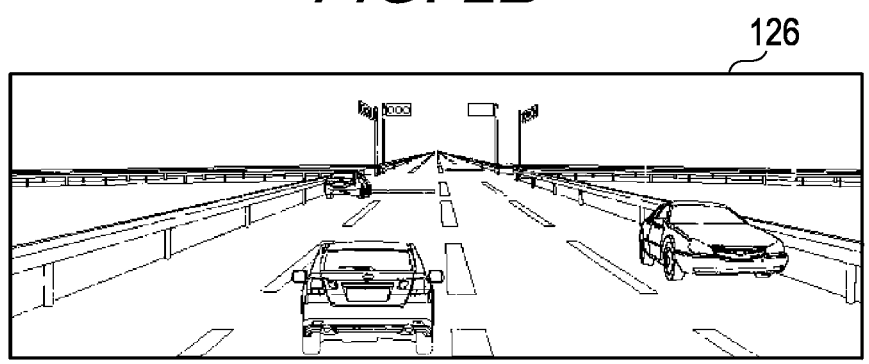

FIGS. 2A and 2B are explanatory diagrams for explaining a luminance image 124 and a distance image 126. For example, Assume that the luminance image (image data) 124 as shown in FIG. 2A is generated with regard to a detection area 122 by the two image capturing devices 110. Here, for the sake of easy understanding, only one of the two luminance images 124 is schematically shown. In the present embodiment, the image processing device 120 obtains a parallax for each block from such luminance image 124, and forms the distance image 126 as shown in FIG. 2B. Each block of the distance image 126 is associated with a parallax of the block. In the drawing, for the sake of explanation, a block from which a parallax is derived is indicated by a black dot.

The parallax can be easily specified at the edge portion (portion where there is contrast between adjacent pixels) of objects, and therefore, the block from which parallax is derived, which is denoted with black dots in the distance image 126, is likely to also be an edge in the Luminance image 124. Therefore, the luminance image 124 as shown in FIG. 2A and the distance image 126 as shown in FIG. 2B are similar in terms of outline of each target object.

The environment recognition device 130 obtains the luminance image 124 and the distance image 126 from the image processing device 120, and uses the luminances based on the luminance image 124 and a relative distance from the subject vehicle 1 based on the distance image 126 to determine which specific object the target object in the detection area 122 corresponds to. In this embodiment, the environment recognition device 130 uses a so-called stereo method to convert the parallax information for each block in the detection area 122 of the distance image 126 into three-dimensional position information including a relative distance, thereby deriving heights. The stereo method is a method using a triangulation method to derive a relative distance of a target object with respect to the image capturing device 110 from the parallax of the target object. The environment recognition device 130 will be explained later in detail.

The vehicle control device 140 avoids a collision with the target object specified by the environment recognition device 130 and performs control so as to maintain a safe distance from the preceding vehicle. More specifically, the vehicle control device 140 obtains a current cruising state of the vehicle 1 based on, for example, a steering position sensor 142 for detecting an angle of the steering and a vehicle speed sensor 144 for detecting a speed of the vehicle 1, thereby controlling an actuator 146 to maintain a safe distance from the preceding vehicle. The actuator 146 is an actuator for vehicle control used to control a brake, a throttle valve, a steering angle and the like. When collision with a target object is expected, the vehicle control device 140 displays a warning (notification) of the expected collision on a display 148 provided in front of a driver, and controls the actuator 146 to automatically decelerate the vehicle 1. The vehicle control device 140 can also be integrally implemented with the environment recognition device 130.

(Environment Recognition Device 130)

Figure 3:
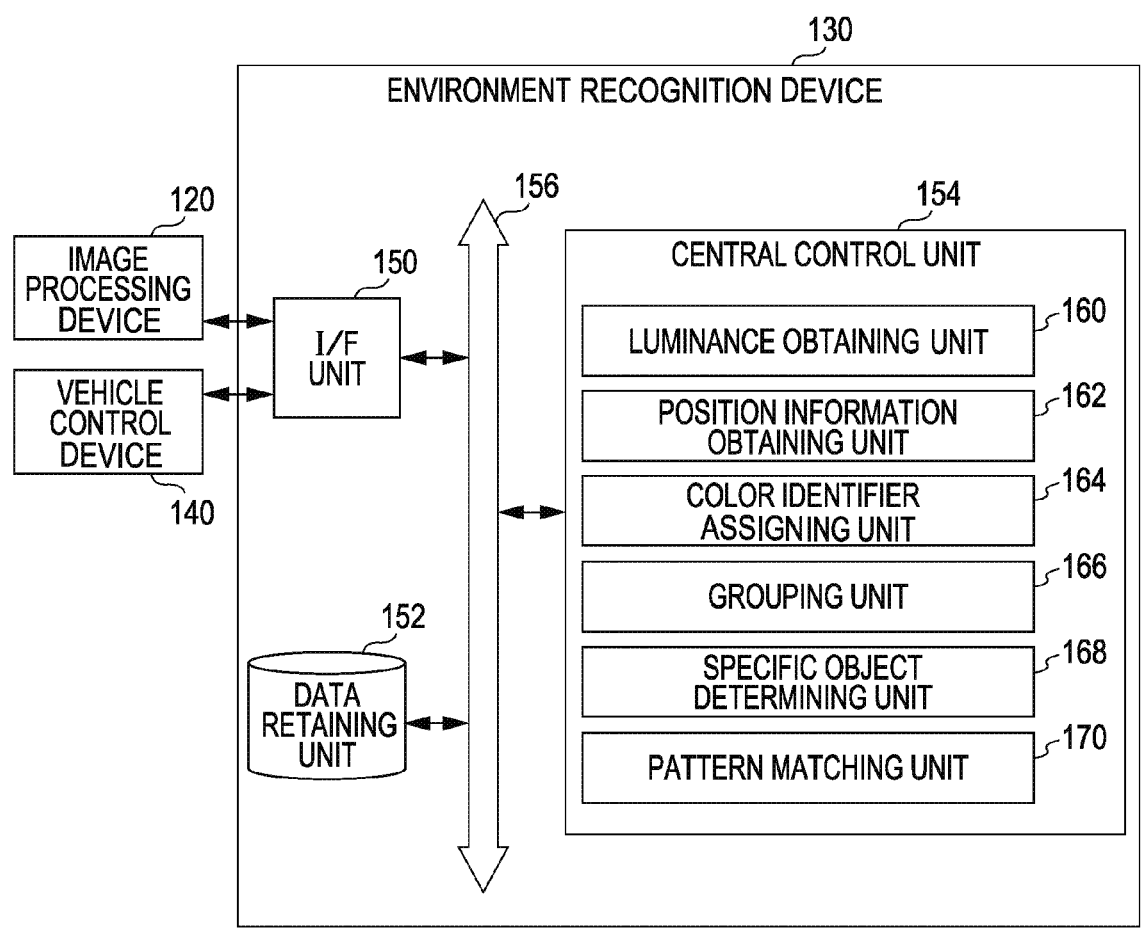
FIG. 3 is a functional block diagram schematically illustrating functions of an environment recognition device.

FIG. 3 is a functional block diagram schematically illustrating functions of an environment recognition device 130. As shown in FIG. 3, the environment recognition device 130 includes an I/F unit 150, a data retaining unit 152, and a central control unit 154.

The I/F unit 150 is an interface for interactive information exchange with the image processing device 120 and the vehicle control device 140. The data retaining unit 152 is constituted by a RAM, a flash memory, an HDD and the like, and retains a color table (association), a specific object table (association) and various kinds of information required for processing performed by each functional unit explained below. In addition, the data retaining unit 152 temporarily retains the luminance image 124 and the distance image 126 received from the image processing device 120. The color table (association) and the specific object table are used as follows.

FIG. 4 is an explanatory diagram for explaining a color table 190. In the color table 190, a luminance range 192 representing a predetermined number of colors defined in advance is associated with a color identifier 194. For example, the luminance range corresponding to red is associated with the color identifier "1". The luminance range corresponding to yellow is associated with the color identifier "2". The luminance range corresponding to blue green is associated with the color identifier "3". The luminance range corresponding to magenta is associated with the color identifier "4". The luminance range corresponding to orange is associated with the color identifier "5". The luminance range corresponding to vermilion is associated with the color identifier "6". The luminance range corresponding to blue is associated with the color identifier "7". The luminance range corresponding to green is associated with the color identifier "8". However, it is to be understood that the luminance ranges are not limited to the luminance ranges described in FIG. 4, and the number of luminance ranges is not limited thereto.

FIG. 5 is an explanatory diagram for explaining a specific object table 200. In the specific object table 200, each specific object is associated with a representing color identifier 202 corresponding to a luminance range of the specific object, one or more color identifiers 194 including a range similar to the luminance of the specific object, and a width range 204 indicating a range of size of the specific object. The specific objects include various objects required to be observed while the vehicle runs on the road, such as "traffic light (red)", "traffic light (yellow)", "traffic light (blue green)", "tail lamp (magenta)", "turn signal (orange)", "road sign (vermilion)", "road sign (blue)", and "road sign (green)". It is to be understood that the specific object is not limited to the objects in FIG. 5. The specific object table 200 defines the order of priority for specifying a specific object, and the environment recognition processing is performed in accordance with the order of priority for each specific object sequentially selected from the plurality of specific objects in the specific object table 200. Among the specific objects, for example, a specific object "traffic light (red)" is associated with color identifiers "1", "5", "6" and a width range "0.2 to 0.4". The representing color identifier 202 is any one of the one or more color identifiers 194, and a color identifier 194 corresponding to the luminances most suitable for specifying the specific object is defined as the representing color identifier 202. FIG. 5 corresponds to FIG. 4, and is configured such that the order of the color identifiers 194 of FIG. 4 is the same as the order of the representing color identifiers 202 of FIG. 5.

In the present embodiment, based on the specific object table 200, any target portion in the luminance image 124 that satisfies the condition of the multiple color identifiers 194 (luminance range 192) with regard to any specific object is adopted as a candidate for the specific object. For example, when the luminance of a target portion are included in the luminance range 192 of the specific object "traffic light (red)" based on the color identifiers "1", "5" and "6", the target portion is adopted as a candidate for the specific object "traffic light (red)". Then, when the target object made by grouping the target portions is extracted in a form which appears to be a specific object, for example, when the size of a grouped target object is included in the width range "0.2 to 0.4 m" of the "traffic light (red)", it is determined to be the specific object. The target portion determined to be the specific object is labeled with a color identifier (identification number) unique to the specific object. A Pixel or a block made by collecting pixels may be used as the target portion. Hereafter, in the present embodiment a pixel are used the target portion for the sake of convenience of explanation.

The central control unit 154 is comprised of a semiconductor integrated circuit including, for example, a central processing unit (CPU), a ROM storing a program and the like, and a RAM serving as a work area, and controls the I/F unit 150 and the data retaining unit 152 through a system bus 156. In the present embodiment, the central control unit 154 also functions as a luminance obtaining unit 160, a position information obtaining unit 162, a color identifier assigning unit 164, a grouping unit 166, a specific object determining unit 168, and a pattern matching unit 170.

The luminance obtaining unit 160 obtains a luminance by the target portion (pixel) (a luminance constituting of three color phases (red, green, and blue) per pixel) from the received luminance image 124 according to a control instruction of the color identifier assigning unit 164 explained later. At this time, when it is, for example, rainy or cloudy in the detection area, the luminance obtaining unit 160 may obtain the luminances after adjusting a white balance so as to obtain the original luminances.

The position information obtaining unit 162 uses the stereo method to convert parallax information for each block in the detection area 122 of the distance image 126 into three-dimensional position information including a horizontal distance x in the width direction, a height y in the height direction from a road surface, and a relative distance z in the depth direction from the subject vehicle 1 according to a control instruction of the grouping unit 166 explained later. The parallax information represents a parallax of each target portion in the distance image 126, whereas the three-dimensional position information represents information about the relative distance of each target portion in the real world. Accordingly, a term such as width, height and relative distance refers to a distance in the real world, whereas a term such as a detected distance refers to a distance in the distance image 126. When the parallax information is not derived by the pixel but is derived by the block, that is, a calculation may be executed in units of pixels with the parallax information being deemed as parallax information about all the pixels which belong to a block.

Figure 6:
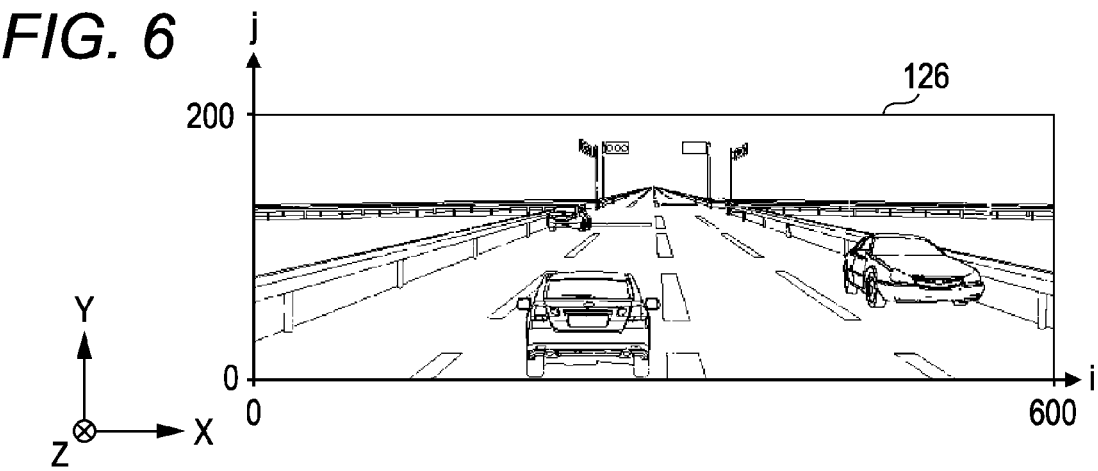
FIG. 6 is an explanatory diagram for explaining conversion into three-dimensional position information performed by a position information obtaining unit.

FIG. 6 is an explanatory diagram for explaining conversion into three-dimensional position information by the position information obtaining unit 162. First, the position information obtaining unit 162 treats the distance image 126 as a coordinate system in a pixel unit as shown in FIG. 6. In FIG. 6, the lower left corner is adopted as an origin (0, 0). The horizontal direction is adopted as an i coordinate axis, and the vertical direction is adopted as a j coordinate axis. Therefore, a pixel having a parallax dp can be represented as (i, j, dp) using a pixel position i, j and the parallax dp.

The three-dimensional coordinate system in the real world according to the present embodiment will be considered using a relative coordinate system in which the vehicle 1 is located in the center. The right side of the direction in which the vehicle 1 moves is denoted as a positive direction of X axis, the upper side of the vehicle 1 is denoted as a positive direction of Y axis, the direction in which the vehicle 1 moves (front side) is denoted as a positive direction of Z axis, and the crossing point between the road surface and a vertical line passing through the center of two image capturing devices 110 is denoted as an origin (0, 0, 0). When the road is assumed to be a flat plane, the road surface matches the X-Z plane (y=0). The position information obtaining unit 162 uses (formula 1) to (formula 3) shown below to transform the coordinate of the pixel (i, j, dp) in the distance image 126 into a three-dimensional point (x, y, z) in the real world.

$$x = CD/2 + z \cdot PW \cdot (i-IV) \quad \text{(formula 1)}$$

$$y = CH + z \cdot PW \cdot (j-JV) \quad \text{(formula 2)}$$

$$z = KS/dp \quad \text{(formula 3)}$$

Here, CD denotes an interval (baseline length) between the image capturing devices 110, PW denotes a corresponding distance in the real world to a distance between adjacent pixels in the image, so-called like an angle of view per pixel, CH denotes an disposed height of the image capturing device 110 from the road surface, IV and JV denote coordinates (pixel) in the image at an infinity point in front of the vehicle 1, and KS denotes a distance coefficient (KS=CD/PW).

The color identifier assigning unit 164 assigns the color identifier 194 to the target portion according to the luminance of the target portion on the basis of the color table 190 retained in the data holding unit 152.

More specifically, the color identifier assigning unit 164 causes the luminance obtaining unit 160 to obtain the luminance of any given target portion in the luminance image 124. Subsequently, the color identifier assigning unit 164 sequentially selects any color identifier 194 registered in the color table 190, and determines whether the obtained luminance of the target portion is included in the luminance range 192 of the color identifier 194 sequentially selected. Then, when the luminance is determined to be in the luminance range 192 under examination, the color identifier is assigned to the target portion so that a color identifier map is generated.

The s color identifier assigning unit 164 sequentially executes a series of comparisons between the luminance of the target portion and the luminance ranges 192 of the multiple color identifiers 194 registered in the color table 190. The order selecting the color identifiers 194 in the color table 190 as explained above also shows the order of priority. That is, in the example of the color table 190 of FIG. 4, the comparison processing is executed in the following order: "red", "yellow", "blue green", "magenta", "orange", "vermilion", "blue", and "green".

When the comparison is performed according to the above order of priority, and as a result, the luminance of the target portion are determined to be included in the luminance range 92 of a color identifier 194 of a high order of priority, the comparison processing is no longer performed for specific objects of a lower order of priority. Therefore, only one color identifier 194 is assigned. This is because a plurality of specific objects do not overlap in the real world, and thus a target object that is once assigned any given color identifier 194 by the color identifier assigning unit 164 is no longer assigned another color identifier 194. By exclusively treating the target portions in this manner, it is possible to avoid redundant specifying processing for the same target portion that is already assigned a color identifier 194, and the processing load can be reduced.

Figure 7:
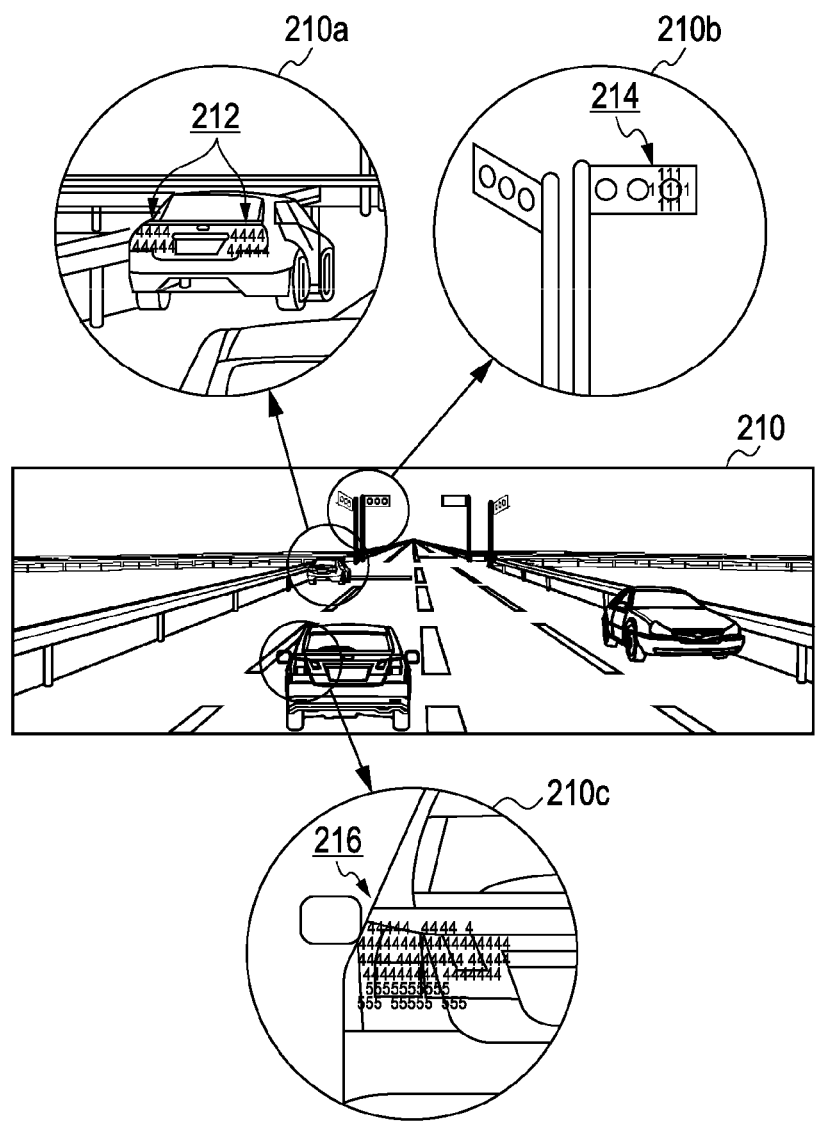
FIG. 7 is an explanatory diagram for explaining a color identifier map.

FIG. 7 is an explanatory diagram for explaining a color identifier map 210. The color identifier map 210 is made by overlaying the color identifiers 294 on the luminance image 124. Therefore, the color identifiers 194 are assigned in a gathered manner to a position of a target object corresponding to a specific object.

For example, in a segment 210a of the color identifier map 210, the luminances of target portions 212 corresponding to the tail lamps of the preceding vehicle are compared with the luminance range 192 of each of the color identifiers "1", "2", "3", and "4". As a result, the luminances of target portions 212 are included in luminance range 192 of the color identifier "4", and therefore, the color identifier "4" is assigned. In a segment 210b of the color identifier map 210, the luminances of target portions 214 corresponding to the light-emitting portions at the right side of the traffic light are included in the luminance range 192 of the color identifier "1", and therefore, the color identifier "1" is assigned. Further, in a segment 210c of the s color identifier map 210, the luminances of target portions 216 corresponding to the back surface lamp portion of the preceding vehicle are compared with the luminance ranges 192 of the color identifiers "1", and "3" in order, and finally, the color identifiers "4" and "5" are assigned. FIG. 7 shows a figure in which color identifiers are assigned to target portions of the luminance image 124. This is, however, a conceptual representation for the sake of easy understanding. In reality, color identifiers are registered as data at the target portions.

The grouping unit 166 adopts any given target portion as a base point, and groups target portions corresponding to a same specific object of which position differences in the width direction x and in the height direction y are within a predetermined range (for example, 1.0 m), thereby making the grouped target portions into a target object. The predetermined range is represented as a distance in the real world, and can be set at any given value.

More specifically, first, the grouping unit 166 successively obtains the color identifier 194 of any given target portion in the luminance image 124. Then, the grouping unit 166 adopts the target portion as a base point, and groups another target portion, of which position differences in the width direction x and in the height direction y are within a predetermined range and which is assigned one of one or more color identifiers 194 associated with a specific object having the color identifier 194 of the target portion as the representing color identifier 202, thus making the grouped target portions into a target object.

The grouping unit 166 also adopts the target portion newly added through the grouping processing as a base point and groups another target portion of which position differences in the width direction x and in the height direction y portion are within a predetermined range and which is assigned one of one or more color identifiers 194 associated with a specific object having the color identifier 194 of the target portion as the representing color identifier 202. Consequently, as far as the distances between the target portions which are assigned one of one or more color identifiers 194 associated with the same specific object is within the predetermined range, all of such target portions are grouped.

In this case, the grouping unit 166 makes the determination using the distance in the with direction x and the distance in the height direction y in the real world, but when a determination is made using the detection distances in the luminance image 124 and the distance image 126, the threshold value of the predetermined range for grouping is changed according to the relative distance z of the target portion. As shown in FIG. 2 and the like, distant objects and close objects are represented in the flat plane in the luminance image 124 and the distance image 126, and therefore, an object located at a distant position is represented in a small (short) size and an object located at a close position is represented in a large (long) size. Therefore, for example, the threshold value of the predetermined range in the luminance image 124 and the distance image 126 is set at a small value for a distant target portion, and set at a large value for a close target portion. Therefore, even when the detection distances are different between a distant position and a close position, the grouping processing can be stably performed. In the case in which the determination is made based on the detection distance on the distance image 126, the predetermined range may be defined by the number of pixels. For example, (adjacent) pixels having a gap of one pixel therebetween in the horizontal direction or the vertical direction may be grouped.

In the above description, each of the difference in the width direction x and the difference in the height direction y is independently determined, and only when both of them are included within the predetermined range, the target portions are grouped into a same group. However, grouping processing may be performed using another calculation. For example, when Euclidean distance, square root of ((difference in the width direction x)²+(difference in the height direction y)²) is included within a predetermined range, target portions may be grouped into the same group. With such calculation, distances between target portions in the real world can be derived accurately, and therefore, grouping accuracy can be enhanced.

Figure 8A:
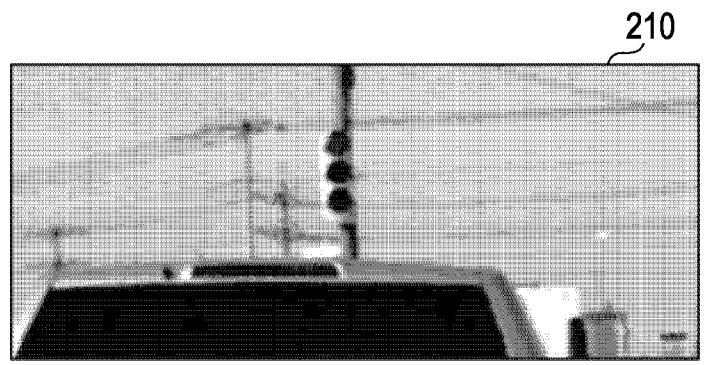
FIGS. 8A to 8D are explanatory diagrams for explaining processing of a grouping unit.
Figure 8B:
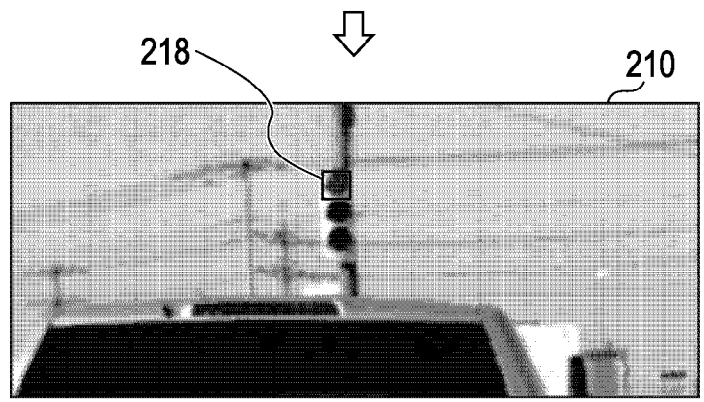

FIGS. 8A to 8D are explanatory diagrams for explaining processing of the grouping unit 166. In the drawings, color identifiers 194 are omitted for the purpose of easy understanding. For example, with respect to the color identifier map 210 as illustrated in FIG. 8A, the grouping unit 166 groups all target portions within the predetermined range that are assigned one of one or more color identifiers 194 associated with the specific object "traffic light (red)", and produces a target object 218 as illustrated in FIG. 8B.

Figure 8C:
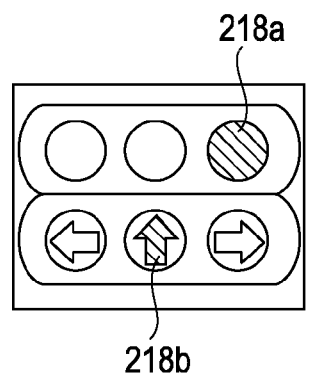

More specifically, for example, as shown in FIG. 8C, it is assumed that there is a two-stage traffic light in which lighting portions in blue, yellow, and red are disposed in parallel in the horizontal direction and, and below the lighting portions in the vertical direction, there are arrow-shaped lighting portions indicating direction in which vehicles are permitted to proceed. In this case, as shown in FIG. 8C, it is assumed that "red" lights up at a position of a target object 218a in the upper stage of the traffic light, and that a "blue green" arrow lights up at a position of a target object 218b in the lower stage of the traffic light. Referring to the specific object table 200, the representing color identifier 202 of the specific object "traffic light (red)" is "1", and the representing color identifier 202 of the specific object "traffic light (blue green)" is "3".

Therefore, the specific object corresponding to the representing color identifier 202 is supposed to be specified by extracting only the luminance range 192 assigned the representing color identifier 202, but color unevenness may occur in the lighting portion, and one specific object does not necessarily emit light in a single color. False color may also occur based on, for example, a Bayer pattern depending on the data structure of the luminance image 124. Accordingly, in the present embodiment, not only the representing color identifier 202 but also one or more color identifiers 194 are associated with one specific object, and the specific object is specified based on luminances of multiple colors.

Figure 8D:
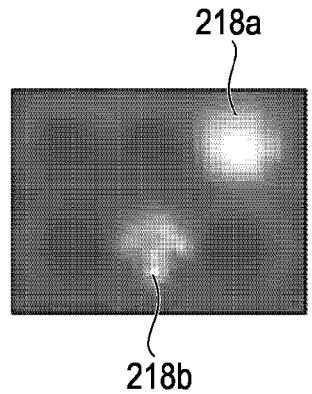

For example, the target object 218a shown in FIG. 8D includes not only the original color "red" of the specific object "traffic light (red)" but also target portions indicating luminances of "orange" and "vermilion" due to color unevenness. Thus, the grouping unit 166 groups luminances of three colors, that is, not only the representing color identifier "1" (corresponding to "red") but also the color identifier "5" (corresponding to "orange") and the color identifier "6" (corresponding to "vermilion"). Therefore, the color unevenness of "orange" and "vermilion" can be absorbed, and the specific object "traffic light (red)" can be specified within an appropriate range.

The target object 218b shown in FIG. 8D includes not only "blue green", that is, the original color of the specific object "traffic light (blue green)", but also a target portion indicating the luminance of "green". Like the specific object "traffic light (red)", in this case, the grouping unit 166 also groups luminances of two colors including not only the representing color identifier "3" (corresponding to "blue green") but also the color identifier "8" (corresponding to "green"). Therefore, the color unevenness of "green" can be absorbed, the specific object "traffic light (blue green)" can be specified within an appropriate range.

As described above, even when target portions include any one of one or more color identifiers 194 associated in the specific object table 200, the grouping unit 166 determines that the target portions are of specific object as far as the target portions are close to each other. However, the following problem may occur when the target portions are simply determined to be the specific object. That is, when the color identifiers 194 of the target object 218 are configured with those other than the representing color identifier 202, the target object 218 may be determined to be a specific object corresponding to the representing color identifier 202 although the target object 218 should be determined to be another specific object corresponding to the color identifier 194. Accordingly, in the present embodiment, the target object 218 is determined to be an intended specific object only when a predetermined condition is satisfied.

More specifically, the grouping unit 166 extracts all the target portions that are assigned one of one or more color identifiers 194 associated with a specific object. Then, only when the representing color identifier 202 of the specific object is included at a predetermined rate or more with respect to all of the target portions, the extracted target portions are grouped. In this case, the predetermined rate can be set at any value. For example, the predetermined rate may be 60%. In so doing, above-described false recognition of the specific object can be prevented, and the target object can be extracted appropriately as the specific object.

Only when there are a predetermined number of target portions that are assigned one of one or more color identifiers 194 associated with the specific object extracted, the grouping unit 166 groups the target portions as the target object. Therefore, it is possible to avoid false recognition as a target object due to luminances that are generated as noise and correspond to any one of the specific objects, whereby grouping can be performed appropriately.

Further, the grouping unit 166 may replace all the color identifiers 194 of the grouped target portions with the representing color identifier 202. The present embodiment aims to extract target portions of which luminances are different from the original luminance due to color unevenness and the like as a specific object corresponding to the original luminance. In other words, even when the luminance of the target portion is different from the original luminance of the specific object, the luminance is determined to be the original luminance of the specific object. Accordingly, the grouping unit 166 replaces the luminances of such particular portion with the original luminance (replaces the color identifiers of such particular portion with the representing color identifier 202 of the specific object), so that the color identifier map 210 is represented with only the representing color identifier 202 corresponding to the original luminance of the specific object, whereby the color identifier map 210 is simplified. According to this configuration, it is less likely to determine that the replaced target portion is another specific object, thereby reducing processing load.

When a target object made as a result of grouping processing by the grouping unit 166 satisfies a predetermined condition, the specific object determining unit 168 determines that the target object is a specific object. For example, as shown in FIG. 5, when the width range 204 is given in the specific object table 200, and the size (both the distance in the width direction x and the distance in the height direction y) of a target object is included in the width range 204 of the specific object associated with the representing color identifier 202 of the target object on the basis of the specific object table 200, the specific object determining unit 168 determines the target object as the specific object. A separate width range 204 may be set for each of the distance in the width direction x and the distance in the height direction y. Here, it is examined whether the target object is of a size adequate to be deemed as a specific object. Therefore, when the size of the target object is not included in the width range 204, the target object can be excluded as information unnecessary for the environment recognition processing. For example, in the example shown in FIGS. 8A to 8D, the size of the target object 218a of FIG. 8B is included in the width range "0.2 to 0.4 m" of the specific object "traffic light (red)", and thus the target object 218a is appropriately specified as the specific object "traffic light (red)".

As a result, the environment, recognition device 130 can extract, from the luminance image 124, one or more target objects as specific objects, and the information can be used for various kinds of control. For example, when the specific object "traffic light (red)" is extracted, this indicates that the target object is a fixed object that does not move, and when the target object is a traffic light for the subject vehicle, this indicates that the subject vehicle 1 has to stop or decelerate. When the specific object "tail lamp (red)" is extracted, this indicates that there is a preceding vehicle travelling together with the subject vehicle 1 and that the back surface of the preceding vehicle is at the relative distance in the depth direction z of the specific object "tail lamp (red)".

When a specific object determined by the specific object determining unit 168 is, for example, a "sign" and it is assumed that the specific object indicates a speed limit, the pattern matching unit 170 further executes pattern matching for a numerical value indicated therein, and specifies the numerical value in this manner, the environment recognition device 130 can recognize the speed limit and the like of the traffic lane in which the subject vehicle is travelling.

In the present embodiment, the specific object determining unit 168 first extracts limited specific objects, and then only has to perform the pattern matching only on the extracted specific objects. Therefore, in contrast to the conventional case where pattern matching is performed on the entire surface of the luminance image 124, the processing load is significantly reduced.

(Environment Recognition Method)

Figure 9:
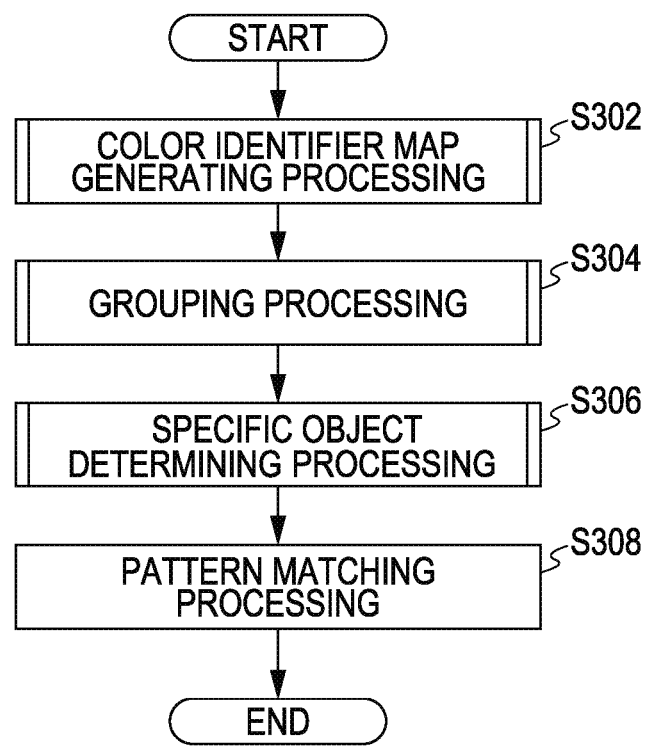
FIG. 9 is a flowchart illustrating an overall flow of an environment recognition method.
Figure 10:
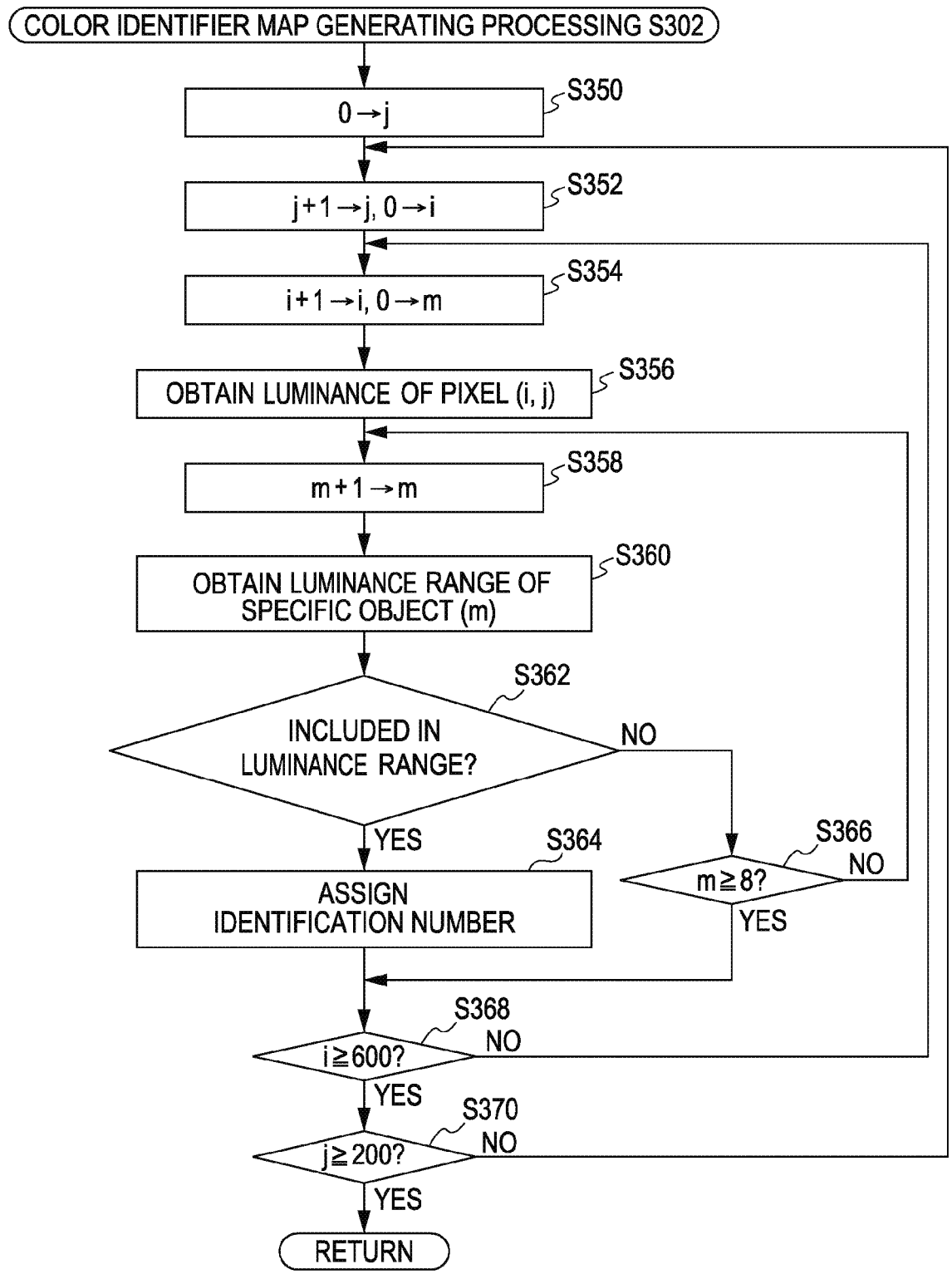
FIG. 10 is a flowchart illustrating a flow of color identifier map generating processing.

Hereinafter, the particular processings performed by the environment recognition device 130 will be explained based on the flowchart shown in FIGS. 9 to 12. FIG. 9 illustrates an overall flow of interrupt processing when the image processing device 120 transmits the distance image (parallax information) 126. FIGS. 10 to 12 illustrate subroutines therein. In this description, a pixel is used as a target portion, and the lower left corners of the luminance image 124 and the distance image 126 are origins. The processing is performed according to the environment recognition method in a range of 1 to 600 pixels in the horizontal direction of the image and 1 to 200 pixels in the vertical direction of the image. In this description, the number of specific objects and color identifiers to be checked is assumed to be eight.

As shown in FIG. 9, when an interrupt occurs according to the environment recognition method in response to reception of the distance image 126, the luminance image 124 obtained from the image processing device 120 is referred to, and a color identifier 194 is assigned to a target portion, whereby a color identifier map 210 is generated (S302).

Subsequently, the target portions between which distances are close in the color identifier map 210 are made into a group (S304), and the grouped target objects are determined as a specific object (S306). If it is necessary to further obtain information from the specific object thus determined, the pattern matching unit 170 executes the pattern matching on the specific object (S308). Hereinafter, the above processing will be explained more specifically.

(Color Identifier Map Generating Processing S302)

As shown in FIG. 10, the specific object provisional determining unit 164 initializes (substitutes "0" to) a vertical variable j for specifying a target portion (pixel) (S350). Subsequently, the specific object provisional determining unit 164 adds "1" to (increments by 1) the vertical variable j, and initializes (substitutes "0" to) a horizontal variable i (S352). Then, the specific object provisional determining unit 164 adds "1" to the horizontal variable i, and initializes (substitutes "0" to) a specific object variable m (S354). Here, the horizontal variable i and the vertical variable j are provided to execute the specific object map generating processing on all of the 600×200 pixels, and the specific object variable m is provided to sequentially compare eight specific objects for each pixel.

The specific object provisional determining unit 164 causes the luminance obtaining unit 160 to obtain a luminance of a pixel (i, j) as a target portion from the luminance image 124 (S356), adds "1" to the specific object variable m (S358), obtains the luminance range 202 of the representing color identifier of the specific object (m) (S360), and determines whether or not the luminance of the pixel (i, j) is included in the luminance range 202 of the representing color identifier of the specific object (m) (S362).

When the luminance of the pixel (i, j) is included in the luminance range 202 of the representing color identifier of the specific object (m) (YES in S362), the specific object provisional determining unit 164 assigns an identification number p representing the specific object (m) to the pixel so as to be expressed as a pixel (i, j, p) (S364). In this manner, the specific object map 210 is generated, in which a identification number is given to each pixel in the luminance image 124. When the luminance of the pixel (i, j) is not included in the luminance range 202 of the representing color identifier of the specific object (m) (NO in S362), a determination is made as to whether or not the specific object variable m is equal to or more than 8 which is the maximum number of specific objects (S366). When the specific object variable m is less than the maximum value (NO in S366), the processings are repeated from the increment processing of the specific object variable m in step S358. When the specific object variable m is equal to or more than the maximum value (YES in S366), which means that there is no specific object corresponding to the pixel (i, j), the processing in step S368 subsequent thereto is performed.

Then, the specific object provisional determining unit 164 determines whether or not the horizontal variable i is equal to or more than 600 which is the maximum value of pixel number in the horizontal direction (S368), and when the horizontal variable i is less than the maximum value (NO in S368), the processings are repeated from the increment processing of the horizontal variable i in step S354. When the horizontal variable i is equal to or more than the maximum value (YES in S368), the specific object provisional determining unit 164 determines whether or not the vertical variable j is equal to or more than 200 which is the maximum value of pixel number in the vertical direction (S370). Then, when the vertical variable j is less than the maximum value (NO in S370), the processings are repeated from the increment processing of the vertical variable j in step S352. When the vertical variable j is equal to or more than the maximum value (YES in 3370), the color identifier map generating processing is terminated.

(Grouping Processing S304)

As shown in FIG. 11, the grouping unit 166 refers to the predetermined range to group target portions (S400), and initializes (substitutes "0" to) the vertical variable j for specifying a target portion (pixel) (S402). Subsequently, the grouping unit 166 adds "1" to the vertical variable j, and initializes (substitutes "0" to) the horizontal variable (S404). Then, the grouping unit 166 adds "1" to the horizontal variable i (S406).

The grouping unit 166 obtains a pixel (i, j, p, dp) including the parallax information dp as the target portion from the luminance image 124 and transforms the coordinate of the pixel (i, j, p, dp) including the parallax information do into a point (x, y, z) in the real world so as to be expressed as a pixel (i, j, p, dp, x, y, z) (S408). Then, a determination is made as to whether the pixel (i, j, p, dp, x, y, z) has a valid (not zero) color identifier p and a group number g is not yet given thereto (S410). When there is a valid color identifier p and a group number g is not yet given (YES in S410), the grouping unit 166 determines whether or not, within a predetermined range from the coordinate position (x, y, z) of the pixel in the real world, there is another pixel that is assigned one of one or more color identifiers 194 associated with a specific object whose representing color identifier is the color identifier p and which is not yet given a group number g (S412).

When there is another pixel which is assigned one of one or more color identifiers 194 and which is not yet given a group number g (YES in S412), the grouping unit 166 determines whether or not among pixels within the predetermined range including the pixel (i, j, p, dp, x, y, z) under examination, which are assigned one of one or more color identifiers 194 associated with the specific object whose representing color identifier is the color identifier p and which are not yet given a group number g, a rate of having the representing color identifier p is equal to or more than a predetermined rate (S414). Then, when the rate is equal to or more than the predetermined rate (YES in S414), the smallest value of the numbers that are not yet used as a group number is newly given to all the pixels within the predetermined range including the pixel under examination (S416). In this case, pixels already grouped as other specific object are excluded from the grouping processing, and the grouping is not executed thereon. Then, the color identifiers 194 of all the grouped pixels are replaced with the representing color identifier p.

In this manner, when within the predetermined range there are multiple target portions whose color identifiers are the same, grouping processing is performed by giving one group number g. At this occasion, the smallest value of the numbers that are not yet used as a group number is employed in order to avoid making a skipped number as much as possible upon group numbering. In so doing, the maximum value of the group number g does not become unnecessarily large, and the processing load can be reduced.

When the color identifier p is not a valid value (zero), or the color identifier p is a valid value but a group number g is already given (NO in S410), when there is no other pixel whose color identifier is the same, or there are other pixels whose color identifiers are the same but a group number g is already given to all the pixels (NO in S412), or when the rate of the representing color identifier 202 is not equal to or more than the predetermined rate (NO in S414), the processing in step S418 subsequent thereto is performed.

Subsequently, the grouping unit 166 determines whether or not the horizontal variable i is equal to or more than 600 which is the maximum value of pixel number in the horizontal direction (S418). When the horizontal variable i is less than the maximum value NO in S418), the processings are repeated from the increment processing of the horizontal variable i in step S406. When the horizontal variable i is equal to or more than the maximum value (YES in S418), the grouping unit 166 determines whether or not the vertical variable j is equal to or more than 200 which is the maximum value of pixel number in the vertical direction (S420). When the vertical variable j is less than the maximum value (NO in S420), the processings are repeated from the increment processing of the vertical variable j in step S404. When the vertical variable is equal to or more than the maximum value (YES in S420), the grouping processing is terminated.

(Specific Object Determining Processing S306)

As shown in FIG. 12, the specific object determining unit 168 initializes (substitutes "0" to) a group variable k for specifying a group (S452). Subsequently, the specific object determining unit 168 adds "1" to the group variable k (S454).

The specific object determining unit 168 determines whether or not there is a target object whose group number g is the group variable k from the luminance image 124 (S456). When there is such target object (YES in S456), the specific object determining unit 168 calculates the size of the target object to which the group number g is given (S458). The size of the target object is specified based on a width direction component and a height direction component. The width direction component is a distance (difference) in the width direction between a pixel located at the left end of the image of the target object and a pixel located at the right end of the image thereof. The height direction component is a distance (difference) in the height direction between a pixel located at the upper end of the image of the target object and a pixel located at the lower end of the image thereof. Then, a determination is made as to whether or not the calculated size is included in within the width range 204 of a specific object represented by the representing color identifier p assigned to the target object whose group number g is the group variable k (S460). For example, when the width direction component of the target object is within the width range 204 of a specific object represented by the representing color identifier p and when the height direction component of the target object is within the width range 204 of the specific object represented by the representing color identifier p, the target object can be determined to be included in the width range 204 of the specific object represented by the representing color identifier p.

When the size is included within the width range 204 of the specific object represented by the representing color identifier p (YES in S460), the specific object determining unit 168 determines that the target object is the specific object (S462). When the size is not included within the width range 204 of the specific object represented by the representing color identifier p (NO in S460), or, when there is no target object whose group number g is the group variable k (NO in S456), the processing in step S464 subsequent thereto is performed.

Subsequently, the specific object determining unit 168 determines whether or not the group variable k is equal to or more than the maximum value of group number set in the grouping processing (S464). Then, when the group variable k is less than the maximum value (NO in S464), the processings are repeated from the increment processing of the group variable k in step S454. When the group variable k is equal to or more than the maximum value (YES in S464), the specific object determining processing is terminated. As a result, the grouped target objects are formally determined to be the specific object.

As described above, as far as a target portion includes any one of one or more color identifiers 194 associated in the specific object table 200, the environment recognition device 130 determines that the target portion is a candidate for one specific object, and therefore, false recognition of the identified object can be prevented, whereby the target object can be extracted appropriately as the specific object.

One or more color identifiers 194 associated in the specific object table 200 are defined only with the color identifiers 194 in the color table 190 defined in advance, and therefore, and only a predetermined number of luminance ranges are examined. Therefore, the processing load can be greatly reduced.

In addition, a program for allowing a computer to function as the environment recognition device 130 is also provided as well as a storage medium such as a computer-readable flexible disk, a magneto-optical disk, a ROM, a CD, a DVD, a BD storing the program. Here, the program means a data processing function described in any language or description method.

While a preferred embodiment of the present invention has been described hereinabove with reference to the appended drawings, it is to be understood that the present invention is not limited to such embodiment. It will be apparent to those skilled in the art that various changes may be made without departing from the scope of the invention.

For example, in the specific object table 200 in the embodiment explained above, only the color identifiers defined in the color table 190 in advance are associated with the specific objects, but any luminance range may be associated with each specific object.

In the above embodiment, the three-dimensional position of the target object is derived based on the parallax between image data using the plurality of image capturing devices 110. However, the present invention is not limited to such case. Alternatively, for example, a variety of known distance measuring devices such as a laser radar distance measuring device may be used. In this case, the laser radar distance measuring device emits laser beam to the detection area 122, receives light reflected when the laser beam is irradiated the object, and measures the distance to the object based on the time required for this event.

In the present embodiment, it is assumed that the image capturing device 110 obtains a color image. However, the present invention is not limited to such case. Alternatively, a monochrome image may be obtained. In this case, the color table 190 is defined by a single-color luminance.

The above embodiment describes an example in which the position information obtaining unit 162 receives the distance image (parallax information) 126 from the image processing device 120, and generates the three-dimensional position information. However, the present invention is not limited to such case. The image processing device 120 may generate the three-dimensional position information in advance, and the position information obtaining unit 162 may obtain the generated three-dimensional position information. Such a functional distribution can reduce the processing load of the environment recognition device 130.

In the above embodiment, the luminance obtaining unit 160, the position information obtaining unit 162, the color identifier assigning unit 164, the grouping unit 166, the specific object determining unit 168, and the pattern matching unit 170 are configured to be operated by the central control unit 154 with software. However, the functional units may be configured with hardware.

The specific object determining unit 168 determines a specific object by, for example, whether or not the size of the target object is included within the width range 206 of the specific object. However, the present invention is not limited to such case. The specific object determining unit 168 may determine a specific object when various other conditions are also satisfied. For example, a specific object may be determined when a gradient of the depth direction z to the width direction x or depth direction z to the height direction y is substantially constant (continuous) in a target object or when the relative movement speed in the depth direction z is constant. Such a gradient may be specified by linear approximation by the Hough transform or the least squares method.

The steps of the environment recognition method in this specification do not necessarily need to be processed chronologically according to the order described in the flowchart. The steps may be processed in parallel, or may include processings using subroutines.

The present invention can be used for an environment recognition device and an environment recognition method for recognizing a target object based on the luminance of the target object in a detection area.

The invention claimed is:

1. An environment recognition device mounted on a vehicle, comprising:
    a data retaining unit that retains association between color identifiers and a luminance range, and retains association between color identifiers and a specific object in front of the vehicle;
    a luminance obtaining unit that obtains a luminance of a target portion in a detection area of a luminance image;
    a color identifier assigning unit that assigns a color identifier to the target portion according to the luminance of the target portion, based on the association between the color identifier and the luminance range retained in the data retaining unit; and
    a grouping unit that extracts and groups a first number of target portions each assigned any one of the color identifiers associated with the same specific object, and of which position differences in the horizontal direction and in the vertical direction are within a predetermined range, based on the association between the specific object and the color identifiers retained in the data retaining unit, wherein
    the data retaining unit retains a representing color identifier for the specific object, the representing color identifier being one of the color identifiers associated with the specific object,
    the grouping unit groups all the first number of target portions only when a second number of target portion assigned the representing color identifier of the specific object is included in the first number of target portions,
    the first number of target portions varies according to a distance of the specific object from the vehicle, and
    the second number of target portions varies in accordance with the first number of target portions.

2. The environment recognition device according to claim 1, wherein the grouping unit may replace all the color identifiers of the grouped target portions with the representing color identifier.

3. An environment recognition method for a vehicle, comprising:
    obtaining a luminance of a target portion in a detection area of a luminance image;
    assigning a color identifier to the target portion according to the luminance of the target portion, based on association between the color identifier and a luminance range retained in a data retaining unit; and
    extracting and grouping a first number of target portions each assigned any one of color identifiers associated with a specific object in front of the vehicle, and of which position differences in the horizontal direction and in the vertical direction are within a predetermined range, based on the association between the specific object and the color identifiers retained in the data retaining unit, wherein
    the data retaining unit retains a representing color identifier for the specific object, the representing color identifier being one of the color identifiers associated with the specific object,
    the extracting and grouping groups all the first number of target portions only when a second number of target portions assigned the representing color identifier of the specific object is included in the first number of target portions,
    the first number of target portions varies according to a distance of the specific object from the vehicle, and
    the second number of target portions varies in accordance with the first number of target portions.

4. An environment recognition device mounted on a vehicle, comprising:
    a memory retaining association between color identifiers and a luminance range, and retaining association between color identifiers and a specific object in front of the vehicle; and
    a processor configured to perform:
        obtain a luminance of a target portion in a detection area of a luminance image;
        assign a color identifier to the target portion according to the luminance of the target portion, based on the association between the color identifier and the luminance range in the memory; and
        extract and group a first number of target portions each assigned any one of the color identifiers associated with the same specific object, and of which position differences in the horizontal direction and in the vertical direction are within a predetermined range, based on the association between the specific object and the color identifiers in the memory, wherein
    the memory retains a representing color identifier for the specific object, the representing color identifier being one of the color identifiers associated with the specific object,
    the processor is further configured to group all the first number of extracted target portions only when a second number of target portions assigned the representing color identifier of the specific object is included in the first number of target portions,
    the first number of target portions varies according to a distance of the specific object from the vehicle, and
    the second number of target portions varies in accordance with the first number of target portions.

5. The environment recognition device according to claim 4, wherein the processor is configured to replace all the color identifiers of the grouped target portions with the representing color identifier.

* * * * *